US008159803B2

(12) United States Patent
Ward et al.

(10) Patent No.: US 8,159,803 B2

(45) Date of Patent: Apr. 17, 2012

(54) HEAT ACTUATED INTERRUPTER RECEPTACLE

(76) Inventors: Michael J. Ward, Maryville, TN (US); Aleph Ruiz Contreras, Oak Ridge, TN (US)

( * ) Notice: Subject to any disclaimer, the term of this patent is extended or adjusted under 35 U.S.C. 154(b) by 241 days.

(21) Appl. No.: 12/632,095

(22) Filed: Dec. 7, 2009

(65) Prior Publication Data

US 2011/0134578 A1 Jun. 9, 2011

(51) Int. Cl.
*H02H 5/04* (2006.01)
*H02H 3/00* (2006.01)
*H02H 9/08* (2006.01)

(52) U.S. Cl. ........................................ 361/103; 361/42

(58) Field of Classification Search .................. 361/103
See application file for complete search history.

(56) References Cited

U.S. PATENT DOCUMENTS

| | | | | | |
|---|---|---|---|---|---|
| 4,763,365 | A | | 8/1988 | Gerondale et al. | |
| 5,590,010 | A | | 12/1996 | Ceola et al. | |
| 5,600,306 | A | * | 2/1997 | Ichikawa et al. | 340/584 |
| 5,742,464 | A | | 4/1998 | Ceola et al. | |
| 6,166,618 | A | | 12/2000 | Robertson et al. | |
| 6,525,914 | B1 | | 2/2003 | Legatti | |
| 6,552,888 | B2 | | 4/2003 | Weinberger | |
| 6,603,385 | B2 | | 8/2003 | Kitchens | |
| 6,707,652 | B2 | | 3/2004 | Engel | |
| 7,385,473 | B2 | | 6/2008 | Fabian et al. | |
| 7,400,225 | B2 | | 7/2008 | Shea | |
| 7,446,643 | B2 | | 11/2008 | Lee et al. | |
| 7,495,876 | B2 | * | 2/2009 | Dunne et al. | 361/103 |
| 7,675,721 | B2 | * | 3/2010 | Elms | 361/42 |
| 2002/0180451 | A1 | | 12/2002 | Leopold et al. | |
| 2007/0081286 | A1 | * | 4/2007 | Jones | 361/103 |
| 2010/0046126 | A1 | * | 2/2010 | Elms | 361/42 |

* cited by examiner

*Primary Examiner* — Dharti Patel

(74) *Attorney, Agent, or Firm* — Knox Patents; Thomas A. Kulaga

(57) ABSTRACT

Apparatus for detecting an overheating condition at an electrical power device and automatically breaking the circuit when the temperature exceeds a setpoint value. In various configurations the device is a receptacle adapted to be used in a wall mounted box or a receptacle unit that is plugged into an existing receptacle and supported in place by the existing receptacle. A temperature switch is wired parallel to a normally open test switch on a ground fault circuit interrupter or other circuit interrupting device. The temperature switch is responsive to the temperature local to the receptacle, such as is caused by poor connections to or in the receptacle. The temperature setpoint is less than the melting temperature of the insulation of the electrical wiring. Upon actuation of the temperature switch, the circuit interrupting device is latched in a tripped position until the device is reset for reuse.

20 Claims, 2 Drawing Sheets

HEAT ACTUATED INTERRUPTER RECEPTACLE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to an electrical device that provides power to an electrical appliance. More particularly, this invention pertains to an electrical receptacle that interrupts the power circuit to the electrical appliance based on the ambient temperature proximate the electrical receptacle.

2. Description of the Related Art

Every year there are thousands of electrical fires in homes. Hundreds die every year in these fires, with many more injured. Some of these fires are caused by electrical system failures and defective appliances. But, many more of these fires are caused by the misuse and poor maintenance of electrical appliances, incorrectly installed wiring, and overloaded circuits and extension cords.

Electrical circuits are protected from overcurrent conditions by circuit breakers. These circuit breakers are centrally located. Fixed wiring runs from the circuit breakers to power receptacles located throughout the home. The typical receptacle is configured to receive two plugs from electrical devices. It is not uncommon for people to use adapters in order to plug more than two electrical devices into such a receptacle. Such misuse, although not commonly resulting in an overcurrent condition that will trip a circuit breaker, often exceeds the capabilities of the adapter, which may result in overheating of the adapter and/or the receptacle. Also, the adapter or one of the multitude of electrical plugs may have a high resistance connection, which results in resistance heating of the connection. Another type of misuse is the continued use of frayed or damage electrical cords. Without the protection of the circuit breaker tripping the circuit, such misuse can result in an electrical fire.

Ground fault circuit interrupters (GFCIs) are becoming more common. Ground fault circuit interrupters monitor the circuit for ground faults, and trip the circuit when one is detected. A ground fault is a condition where the current flowing through the hot lead to the device is not equal to the current flowing through the neutral lead to the device. When the two current values are not equal, then some amount of current must be flowing through a ground connection, which indicates a potential electrical safety hazard. Although GFCIs provide electrical safety to people, GFCIs do not protect against hazards that typically result in electrical fires.

Arc fault circuit interrupters (AFCIs) are also becoming common. Arc fault circuit interrupters monitor the circuit for electrical arcs, such as caused by loose connections or frayed wiring that causes a short circuit. The AFCI typically reacts to an arcing condition before a traditional circuit breaker, which operates based on current flow or thermal heating of a trip element. Arc fault circuit interrupters are an important line of defense against electrical fires, but AFCIs do not detect all conditions that result in electrical fires.

Attempts have been made to provide a device useful for reducing the number of electrical fires. For example, U.S. Pat. No. 7,400,225 discloses a receptacle that includes a fusible link that interrupts the circuit upon detecting an overheating condition, such as a glowing contact or series arcing. The fusible link opens the circuit permanently, thereby requiring replacement of the receptacle in order to return the connected devices back to service.

BRIEF SUMMARY OF THE INVENTION

A temperature switch is incorporated in a ground fault interrupter (GFI) or other circuit interrupter in such a way that the test feature of the interrupter is actuated upon detection of an elevated ambient temperature, thereby causing the interrupter to break the circuit for the load. The broken circuit is latched until a reset switch is actuated. The temperature switch has a tripping setpoint between the maximum operating rating of the cable and/or wiring and the insulation melting point. In this way, potentially hazardous conditions that do not involve current flow sufficient to trip upstream circuit breakers are prevented from developing into a hazardous condition. The temperature switch is responsive to the ambient temperature proximate the receptacle.

In one embodiment, the temperature switch is a normally open switch with the switch contacts in parallel with the normally open contacts of the test switch of the interrupter. The temperature switch is positioned proximate the receptacle housing in such a manner that the temperature switch is responsive to heat generated from the various electrical connections within and/or plugged into the receptacle housing. In various embodiments the receptacle is configured for permanent mounting with connections to the service wiring or as a portable unit that plugs into another receptacle.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Apparatus for interrupting an electrical circuit upon detecting a high temperature is disclosed. The high temperature is greater than the wire/cable temperature rating and less than the melting temperature of the insulation. The high temperature is often caused by misuse of the receptacle 102, such as by using an adapter to plug multiple devices into the receptacle 102 and/or using frayed or damaged cords.

Figure 1:
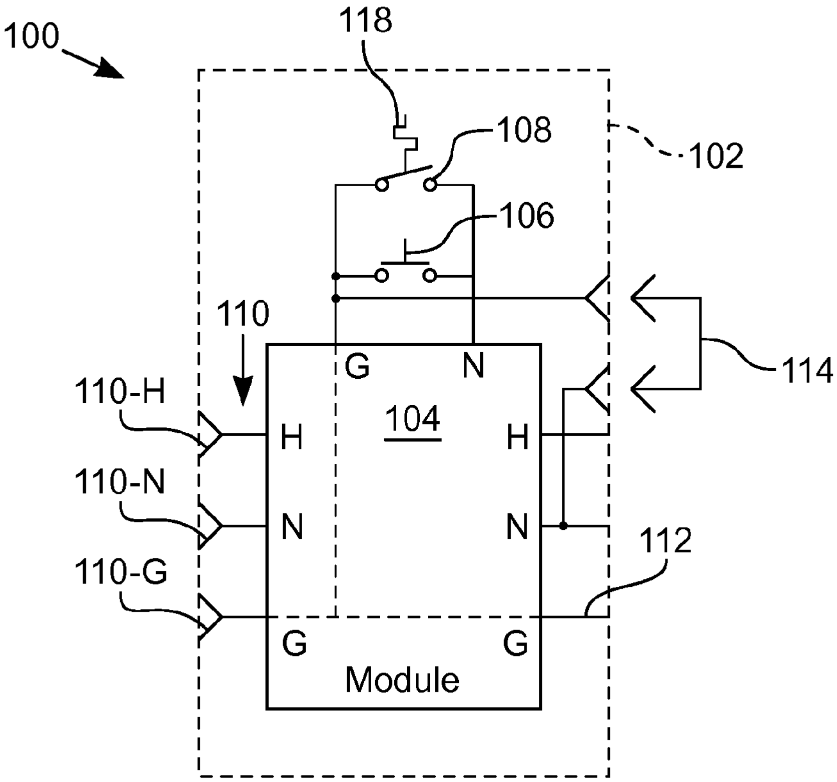
FIG. 1 is a schematic diagram of one embodiment of a heat actuated interrupter receptacle.

FIG. 1 illustrates a schematic diagram of one embodiment of a heat actuated interrupter receptacle device 100. A receptacle 102 houses an interrupting module 104 that includes a set of input connections 112, such as those that connect to a power source, and a set of output connections 110, such as those of a receptacle socket. The receptacle 102 also includes a test switch 106 that is connected to the module 104. Connected in parallel with the test switch 106 is a temperature switch 108.

The module 104, in one embodiment, is a ground fault interrupting (GFI) module that breaks, or interrupts the circuit between the input connections 112 and the output connections 110. Corresponding ones of the input connections 112 are connected to the output connections 110 to form a circuit between the input 112 and the output 110 during normal, or non-tripped, operation. The module 104 interrupts the circuit upon detection of a ground fault condition. A ground fault condition is a current imbalance between the hot H and neutral N connections of the input connections 112, such as when the current flow through the hot H connection 110-H is greater than the current flow through the neutral N connection 110-N. In a three-conductor system, such a condition can occur when a portion of the current flowing through the hot H lead 110-H also flows through the ground G lead 110-G or through another ground connection, such as an electrical earth. The test switch 106 in such an embodiment simulates an imbalance, or a ground fault, and causes the GFI module 104 to trip, thereby interrupting the circuit connected to the output connections 110.

The module 104, in another embodiment, is a circuit interrupting module that breaks, or interrupts the circuit between the input connections 112 and the output connections 110. The circuit interrupting module 104 includes a relay or circuit breaker that breaks the circuit between the input connections 112 and the output connections 110. In such an embodiment, the test switch 106 actuates the relay or circuit breaker and causes the circuit interrupting module 104 to trip, thereby interrupting the circuit connected to the output connections 110.

A temperature switch 108 is connected in parallel with the test switch 106. In the illustrated embodiment, the test switch 106 is a normally open switch and the temperature switch 108 is also a normally open switch before it is actuated by a sensed high temperature. In this way, either the temperature switch 108 or the test switch 106 will actuate the module 104 and interrupt the circuit between the input connections 112 and the output connections 110. In another embodiment, the test switch 106 is a normally closed switch that opens to test. In such an embodiment, the temperature switch 108 is a normally closed switch in series with the test switch 106.

The temperature switch 108 includes a temperature sensor 118 that is responsive to the ambient temperature around the receptacle 102. In one embodiment, the temperature switch 118 is a mercury switch in which the mercury level in a capillary rises with increasing temperature. When the temperature setpoint is reached, the mercury bridges a gap between two conductors, thereby causing the temperature switch 108 to close and actuate the module 104. In other embodiments, the temperature switch 108 includes other temperature sensors that cause the temperature switch 108 to actuate upon detection of a high temperature.

The temperature switch 108 is responsive to a high local temperature. Typically, the temperature rating of cables and wiring used for a receptacle 102 is 75 degrees Centigrade. The insulation of such cables and wiring often has a melting point of 95 degrees Centigrade. In one embodiment, the temperature switch 108 has a high temperature setpoint between the cable/wiring temperature rating value and the insulation's melting temperature. In an embodiment with a cable rating of 75 degrees and an insulation melting temperature of 95 degrees, the temperature switch 108 has a setpoint at approximately 85 degrees Centigrade.

The temperature of a receptacle device 100 will increase above the room's ambient temperature for various reasons, including high current levels that are not sufficiently high to trip an upstream circuit breaker. The elevated temperature is transferred from the metal conductors to the receptacle 102. The potentially thermally hot conductors include the prongs on the plug that connects to the output connectors 110 and the service wiring that connects to the input connectors 112. The temperature sensor 118 is responsive to the temperature of the thermally hot conductors. In one embodiment, the temperature sensor 118 is in thermal contact with the receptacle 102, which has a temperature corresponding to that of the thermally hot conductors. In another embodiment, the temperature sensor 118 is positioned proximate the conductors, for example, within a cavity containing the input connections 112.

The illustrated embodiment also shows a jumper 114. The jumper 114 plugs into or otherwise connects to the receptacle 102 to connect the neutral N of the power connections 112 to the ground G of the test switch 106. The ground G of the test switch 108 is also connected to the ground G of the input 112 and output 110. In other embodiments, the function of the jumper is performed by a switch or other device that selectively connects the neutral N of the power connections 112 to the ground G of the module 104. With the jumper 114 connected, the embodiment with the GFI module 104 will function when a two-conductor plug is connected to the output connections 110. With the jumper 114 disconnected, the module 104 is suitable for three-conductor plugs.

FIG. 1 illustrates a simplified schematic of one embodiment of a heat actuated interrupter receptacle 100. The simplified schematic does not illustrate various connections, for example, the reset switch connections; however, those skilled in the art will recognize the need for such wiring and understand how to wire such a circuit, based on the components ultimately selected for use.

Figure 2:
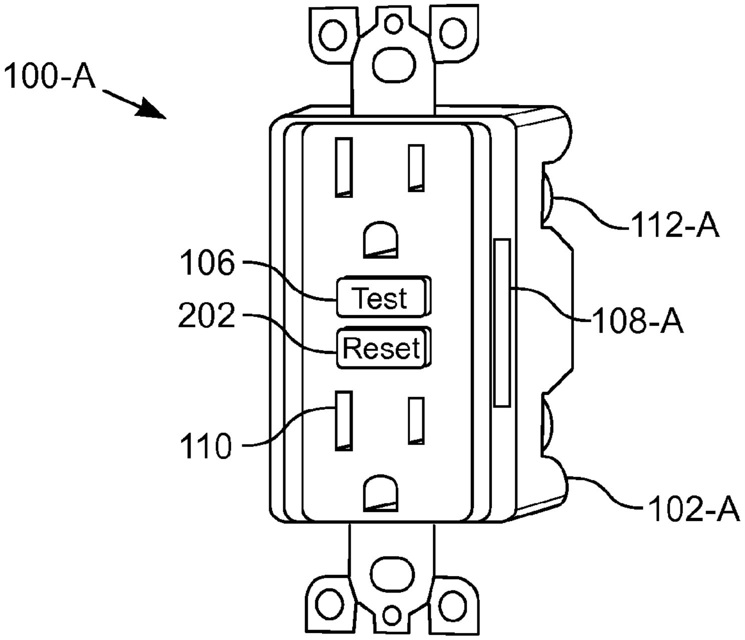
FIG. 2 is a perspective view of one embodiment of a heat actuated interrupter receptacle.

FIG. 2 illustrates a perspective view of one embodiment of a heat actuated interrupter receptacle device 100-A. The illustrated heat actuated interrupter receptacle device 100-A includes an in-wall mountable receptacle 102-A that has a pair of sockets for the output connections 110. The illustrated configuration is configured to be received by a wall mounted electrical box that has fixed wiring installed. Such wall mounted electrical boxes are used to receive electrical receptacles. The illustrated heat actuated interrupter receptacle device 100-A is dimensioned to replace a conventional receptacle in the box.

Accessible between the two sockets 110 are pushbuttons for the test switch 106 and a reset switch 202. On the rear of the receptacle 102-A are the input connections 112-A. The input connections 112-A are configured for connecting to fixed, or service, wiring that is terminated at a central circuit breaker panel. The illustrated input connections 112-A are screw terminals positioned on the rear of the receptacle 102-A in a recessed area.

Attached to the side of the receptacle 102-A is a temperature sensor 108-A. In various embodiments, the temperature sensor 108-A is embedded within the receptacle 102-A or attached to the surface of the receptacle 102-A. For the embodiment in which the temperature switch 108 includes a mercury switch, the mercury switch is attached to the receptacle 102-A such that the mercury switch is positioned with the proper orientation when the receptacle 102-A is installed.

Operating the test switch 106 interrupts the electrical circuit between the input connections 112-A and the output connections 110. When the temperature switch 108 actuates upon sensing a rising temperature greater than or equal to the setpoint, the electrical circuit between the input connections 112-A and the output connections 110 is broken or interrupted. Operating the reset switch 202 resets the heat actuated interrupter receptacle device 100-A and completes the interrupted circuit between the input connections 112-A and the output connections 110.

Figure 3:
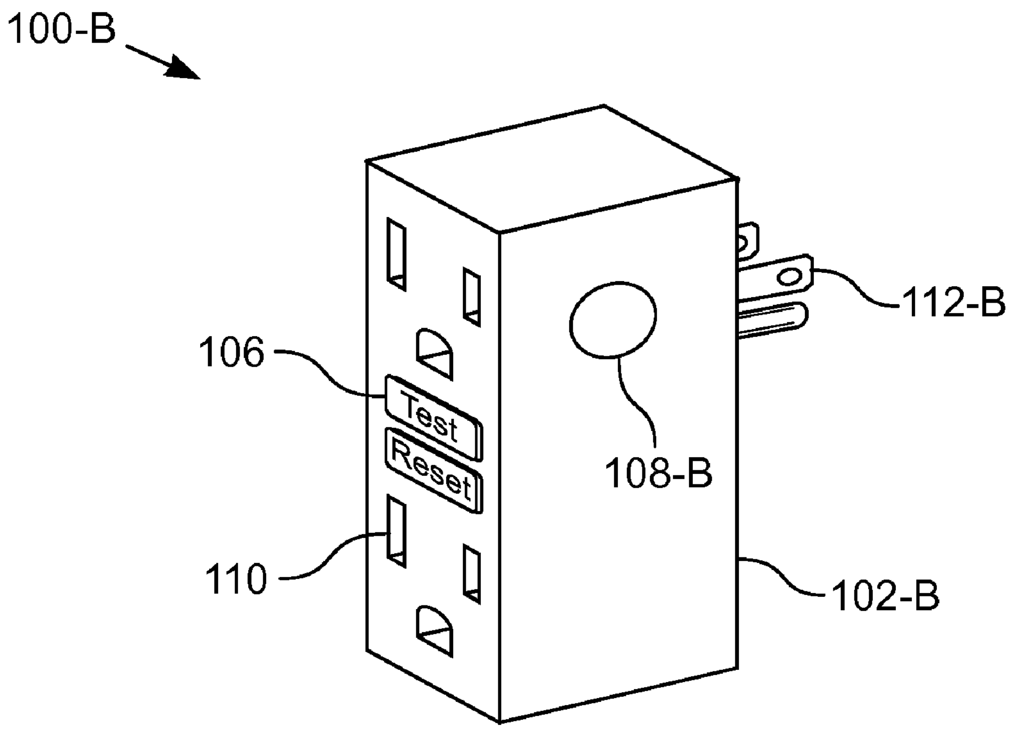
FIG. 3 is a perspective view of another embodiment of a heat actuated interrupter receptacle.

FIG. 3 illustrates a perspective view of another embodiment of a heat actuated interrupter receptacle device 100-B. The illustrated embodiment includes an adapter receptacle 102-B that is portable, that is, the adapter receptacle 102-B is configured to be plugged into a mating receptacle and the adapter receptacle 102-B is not permanently installed to the wiring connected to the central circuit breaker panel.

The adapter receptacle 102-B has an enclosure with input connections 112-B configured as a conventional plug that mates with a receptacle socket. In various embodiments, the adapter receptacle 102-B has one or a pair of input connections 112-B. In the illustrated embodiment, the temperature switch 108-B is positioned proximate the surface of the housing of the adapter receptacle 102-B. The position of the temperature switch 108-B is such that the temperature switch 108-B is responsive to heat generated by the input connections 112-B, the output connections 110, and/or internal to the interrupter receptacle device 100-B.

The heat actuated interrupter receptacle device 100 includes various functions. The function of sensing misuse that results in an elevated operating temperature of the receptacle 102 is implemented, in one embodiment, by the temperature switch 108 that is positioned at a location that has a thermally conductive path between the temperature switch 108 and the heat generating component.

The function of repeatedly detecting an over-temperature condition is implemented, in one embodiment, by a temperature switch 108 that is capable of being repeatedly actuated. In one such embodiment, the temperature switch 108 is one that does not self-destruct upon actuation, such as one that relies upon a material to melt in order to operate. An example of a temperature switch 108 that is capable of being operated repeatedly is a switch in which a sensor or material 118 moves as the temperature increases until the material causes a circuit to be completed between two conductors, thereby operating the switch. In various embodiments, the material is a liquid, such as mercury, or a metal, such as a bimetallic member. In other embodiments, the temperature switch 108 is an electronic device that senses the temperature and causes a switch to operate. In one such embodiment, the temperature switch includes a temperature sensor such as a resistance temperature device (RTD) connected to a switching circuit.

The function of interrupting a circuit is implemented, in one embodiment, by the module 104 that contains a circuit interrupting component. In one such embodiment, the module 104 is a ground fault circuit interrupter that breaks the circuit upon detection of a ground fault and also when the test switch 106 is actuated. In another such embodiment, the module 104 is a circuit interrupter, such as a relay or circuit breaker similar to that in a GFCI, that includes a test switch 106.

The function of resetting the interrupted circuit is implemented, in one embodiment, by the reset switch 202 that causes the module 104 to restore the interrupted circuit, providing that the over-temperature condition that caused the module 104 to interrupt the circuit has been cleared. In other words, the module 104 latches the interrupted condition when the module 104 is actuated. The module 104 is reset only when the condition causing the circuit interruption is cleared.

From the foregoing description, it will be recognized by those skilled in the art that a reusable heat actuated interrupter receptacle device 100 has been provided. The interrupter receptacle device 100 includes an interrupting module 104 that is actuated by a temperature switch 108 that is responsive to the temperature of the receptacle 102. The temperature switch 108 is a non-destructive switch that is operable repeatedly. The interrupting module 104 is resettable after the circuit interrupting condition is corrected and the device 100 is ready for use without requiring replacement of any components.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for detecting an overheating condition at a ground fault circuit interrupting receptacle, said apparatus comprising:

a module having an input and an output, said module including a ground fault circuit interrupter, said module selectively electrically connecting said input to said output, said output being a socket configured to receive an electrical power plug with at least two prongs;

a test switch operatively connected to said module, said ground fault circuit interrupter interrupting a circuit between said input and said output when said test switch is actuated, said module latching in a tripped configuration when said test switch is actuated;

a reset switch operatively connected to said module; and a temperature switch responsive to a temperature proximate said module, said temperature switch having a setpoint between a maximum operating temperature and an insulation melting temperature of a wire proximate said temperature switch, said module interrupting said circuit between said input and said output when said temperature switch senses said temperature being greater than said setpoint, said module resetting said circuit after said reset switch is actuated with said temperature switch sensing said temperature being less than said setpoint.

2. The apparatus of claim 1 wherein said test switch has a normally open contact that is connected to said module, said temperature switch having a normally open contact in parallel with said test switch, and said normally open contact in said temperature switch closing when said temperature switch senses said temperature being greater than said setpoint.

3. The apparatus of claim 1 further including a plug connected to said input, said plug configured to be received by an electrical power receptacle.

4. The apparatus of claim 1 wherein said input is configured for connecting said module to fixed wiring connected to a power source.

5. The apparatus of claim 1 wherein said output is a two-wire power connection, and said module includes a connection from a neutral to a ground of said input.

6. An apparatus for detecting an overheating condition at an electrical power receptacle, said apparatus comprising:

a module having an input and an output, said module configured to repeatedly interrupt a circuit between said input and said output;

a test switch operatively connected to said module, said module interrupting said circuit between said input and said output when said test switch is actuated, and said module latching in a tripped configuration when said test switch is actuated;

a reset switch operatively connected to said module; and a temperature switch responsive to a temperature proximate said module, said temperature switch having a setpoint between a maximum operating temperature and an insulation melting temperature of a wire proximate said temperature switch, said module interrupting said circuit between said input and said output when said temperature switch senses said temperature being greater than said setpoint, said module resetting said circuit when said reset switch is actuated with said temperature switch sensing said temperature being less than said setpoint.

7. The apparatus of claim 6 wherein said test switch has a normally open contact that is connected to said module, said temperature switch has a normally open contact in parallel with said test switch, and said normally open contact in said temperature switch closing when said temperature switch senses said temperature being greater than said setpoint.

8. The apparatus of claim 6 wherein said module includes a ground fault circuit interrupter.

9. The apparatus of claim 6 further including a plug connected to said input, said plug configured to be received by an electrical power receptacle, said module and said plug physically connected such that said plug supports said module in fixed relationship to said electrical power receptacle when said electrical power receptacle receives said plug.

10. The apparatus of claim 6 wherein said input is configured for connecting said module to fixed wiring connected to a power source, and said module is dimensioned and configured to be mounted in a wall mounted electrical box.

11. The apparatus of claim 6 wherein said output includes a socket configured to receive an electrical power plug, said output is a two-wire power connection, and said module including a connection from a neutral to a ground of said input.

12. An apparatus for detecting an overheating condition at a power receptacle, said apparatus comprising:

a module having an input and an output, said module configured to interrupt a circuit connecting said input and said output;

a temperature switch responsive to a temperature proximate said module, said temperature switch having a setpoint between a maximum operating temperature and an insulation melting temperature of a wire proximate said temperature switch, said temperature switch connected to said module, said module interrupting said circuit between said input and said output when said temperature switch senses said temperature being greater than said setpoint; and a reset switch connected to said module, said module resetting the interrupted circuit after said reset switch is actuated and said temperature switch is sensing said temperature being less than said setpoint.

13. The apparatus of claim 12 further including a test switch connected to said module, said test switch causing said module to interrupt a circuit between said input and said output when said test switch is actuated.

14. The apparatus of claim 13 wherein said temperature switch is electrically connected to said test switch.

15. The apparatus of claim 13 wherein said test switch has a normally open contact that is connected to said module, said temperature switch has a normally open contact in parallel with said test switch, and said normally open contact in said temperature switch closing when said temperature switch senses said temperature being greater than said setpoint.

16. The apparatus of claim 12 wherein said module includes a ground fault circuit interrupter with a test switch, and said test switch connected in parallel with said temperature switch.

17. The apparatus of claim 12 further including a plug connected to said input, said plug configured to be received by an electrical power receptacle, said module and said plug physically connected such that said plug supports said module in fixed relationship to said electrical power receptacle when said electrical power receptacle receives said plug.

18. The apparatus of claim 12 wherein said input is configured to connect said module to fixed wiring connected to a power source, and said module is dimensioned and configured to be mounted in a wall mounted electrical box.

19. The apparatus of claim 12 wherein said output includes a socket configured to receive an electrical power plug, said output is a two-wire power connection, and said module includes a connection from a neutral to a ground of said input.

20. The apparatus of claim 12 wherein said output includes a socket configured to receive an electrical power plug, and said output is a three-wire power connection.

* * * * *